UNITED STATES PATENT OFFICE.

WILLIAM A. GAY, OF NEWARK, NEW JERSEY.

PREPARING ARTICLES FOR PLATING PURPOSES.

SPECIFICATION forming part of Letters Patent No. 321,711, dated July 7, 1885.

Application filed April 16, 1885. (No specimens.)

*To all whom it may concern:*

Be it known that I, WILLIAM A. GAY, a citizen of the United States, residing at Newark, in the county of Essex and State of New Jersey, have invented a certain new and useful Improvement in the Preparing of Articles for Plating Purposes, of which the following is a full, clear, and exact specification.

My invention has relation to the embellishment of common earthenware and other ceramics or non-conducting bodies by electroplating; and my improvement consists in a novel means of giving to such non-conducting bodies an electric-conducting surface adapted to receive a metallic deposit. This I accomplish by applying to the surface of the article a coating of some carbonaceous substance and subjecting the same to heat to form a carbonized basis for the electro deposit.

Heretofore the deposition of metals from their respective salts have been generally restricted to metallic bodies by reason of their affinity and conducting power; but attempts have been made to give to non-conducting bodies a conducting-surface by brushing the surface of the body with plumbago or bronze powder, and then precipitating thereon the metallic deposit. In this case, however, but a slight adhesion takes place, and consequently the metal deposit soon separates from the surface of the body. To overcome this objection, by producing or forming a conducting-surface capable of receiving a metallic coating and becoming inseparably combined therewith, is the purpose of this improvement.

In carrying out my process, I may employ as a coating sugar in solution, sirup, tar, or any other carbonaceous material applied to the non-conducting body either with or without heat, and either compounded or singly, the treatment and carbonization of the coating substance being, however, the same in all cases.

As a coating for articles composed of clay and similar materials I have found the following compound to be productive of good results:

I take clay, coke, or any analogous substance, either singly or in combination, and, having reduced the same to a powder, I mix with it a suitable portion of sugar in solution, or sirup, tar, or other carbonaceous material, stirring the same until a perfect incorporation of the several ingredients is effected. If tar is used the mass should be kept at a gentle heat, in order to expel all moisture from the tar and reduce it to a more fluid condition. The exact proportion of each substance cannot be stated, as the quantity of sirup or binding material will vary considerably, according as the powder differs in its property of absorption and degree of fineness. The proportions may, however, be approximately stated at, say, fourteen pounds of sirup or tar to from forty-five to fifty pounds of the base or powder. The result of the above operation, if properly conducted, will be a powder apparently dry, but adhesive under pressure with a moderate heat.

In preparing clay and earthenware articles, I prefer to take the ware before it is finished by glazing or sizing. After covering the surface of the body with sugar in solution, sirup, tar, or other carbonaceous material, it is placed in a mold of suitable size and shape, containing a proper quantity of the powder above mentioned, and the whole submitted to pressure under a moderate heat until the mass is firmly molded upon the core or article. Upon being removed from the molds, the articles thus coated are placed in suitable crucibles or pots, and the spaces between the articles filled up with fine sand or analogous substance to exclude the air. Covers are placed on the crucibles and the joints luted with clay in a manner similar to the usual process of carbonization. The crucibles or pots are then placed in a suitable furnace, and are kept at a dull red heat for from one to two hours, when they are taken out and allowed to gradually cool. The articles are then removed and the carbonized surfaces carefully cleaned from any sand or dust which might have adhered thereto, when they are ready to receive the metallic deposit, which is accomplished in the usual manner.

In preparing articles where it is desirable that the surface should have a thick carbonized basis for the electro deposit, the process of molding is preferable. In other cases, however, a practical conducting-surface may be imparted to the article by covering or impregnating the surface with any suitable carbonaceous substance. After being carefully dried, to expel all moisture, the surface-coating is carbonized by the means heretofore set forth.

My method of giving to non-conducting bodies a carbonized surface coating as a basis for the metallic deposit is applicable to earthenware, clay, porcelain, and all other non-conducting materials which possess the same or similar properties.

The material or compound heretofore mentioned may be used to form the article itself, in which case a mold of suitable form is filled with the dry powder, which is slightly heated, so as to render the compound somewhat plastic, and the whole is then subjected to heavy pressure to solidify the mass. The formed articles, after being removed from the molds, are placed in crucibles and the operation of carbonization carried on, as already described. It is not necessary that the entire mass should be uniformly carbonized, or that carbonization of the material should extend much below the surface, as all that is requisite is that a suitable carbonized basis be formed to make it a good conductor of electricity.

What I claim as new, and desire to secure by Letters Patent, is—

1. Preparing non-conducting bodies for electroplating by the process of carbonization, as and for the purpose set forth.

2. The within-described process of treating earthenware and analogous material for metal plating, which consists in coating the surface with some carbonaceous substance, and carbonizing the same, as and for the purpose set forth.

3. The compound herein described for producing a basis to receive metallic deposits, consisting of finely-powdered clay, coke, or similar material mixed with a solution of sugar or other binding substance and carbonized, as set forth.

WILLIAM A. GAY.

Witnesses:
HERMAN G. LOEW,
CHARLES H. YATES.